Figure 2:
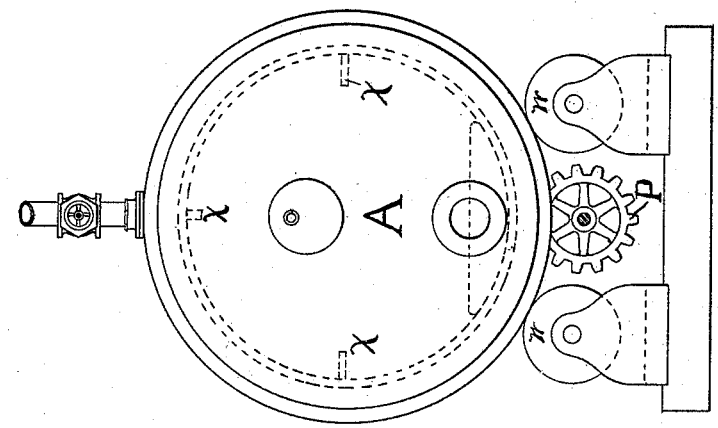

(No Model.) 2 Sheets—Sheet 1.

J. L. ALBERGER.
PURIFYING WATER FOR BOILERS AND SALT MAKING.

No. 443,186. Patented Dec. 23, 1890.

Witnesses.
Theo. A. Elliott
B. G. Mering

Inventor.
John L. Alberger (No Model.) 2 Sheets—Sheet 2.

J. L. ALBERGER.
PURIFYING WATER FOR BOILERS AND SALT MAKING.

No. 443,186. Patented Dec. 23, 1890.

Witnesses.
Theo. A. Elliott
B. G. Mering

Inventor.
John L. Alberger.

UNITED STATES PATENT OFFICE.

JOHN L. ALBERGER, OF BUFFALO, NEW YORK.

PURIFYING WATER FOR BOILERS AND SALT-MAKING.

SPECIFICATION forming part of Letters Patent No. 443,186, dated December 23, 1890.

Application filed April 2, 1890. Serial No. 346,340. (No model.)

*To all whom it may concern:*

Be it known that I, JOHN L. ALBERGER, a citizen of the United States, residing at Buffalo, in the county of Erie and State of New York, have invented a new and useful Improvement in Purifying Water for Boilers and Salt-Making, of which the following is a specification.

This invention relates to the purification of feed-water for steam-boilers or of saline solutions to be used in making salt.

It is designed to extract those soluble crystallizable impurities and those mechanically combined or insoluble which adhere to the heating-surfaces of steam-generators and salt-evaporators, causing loss of effect and damage to the apparatus.

It consists of the abstraction of the impurities in the fluids under treatment by first heating them to such a temperature as to cause the chemically-combined impurities to become insoluble, then depositing them on the surfaces of substances, presenting a large surface in the containing-vessel called a "purifier," together with the mechanically-contained impurities, also providing means by which in a simple and efficacious manner the substances to which the impurities adhere and the interior surfaces of the purifier may be cleaned and divested of adhering impurities, and thus easily and speedily fitted for continuous operation.

The advantages of the invention consist in the comparative ease and certainty by which these results are accomplished. It is well known that all of the crystallizable impurities in feed-water or salt brine which adhere to the heating-surfaces of steam-boilers or salt-evaporators, forming a troublesome scale, may be made insoluble in the liquids containing them by heating the liquids to about three hundred degrees (300°) Fahrenheit. Owing to this fact, numerous devices have been proposed to take advantage of it, so that by heating the fluids and passing them over pans heated by live steam, or by filtering, or by depositing upon substances in a purifier a partial result is attained. All such apparatuses, however effective at the outset, are objectionable in practice, because after usage the surfaces become loaded, the filters clogged, and the containing-vessel must be opened, the contents taken out, cleaned, and replaced in order to restore the apparatus to its operative condition. My invention differs from these devices in that the purifier need not be opened for the purpose of cleaning the depositing-surfaces, but is cleaned by mechanical appliances in an expeditious manner. If the apparatus be designed to purify water for steam-boilers, the water may be partially heated in the ordinary way in an exhaust-heater and complete the heating to the proper temperature by live steam in the purifier. This may also be done when making pure brine for salt. If the weakening of the strength of the saline solution by the water condensed from the steam used in direct contact be not objectionable, a good result will be obtained; but if such weakening, which will be in practice equal to five per cent. loss of strength, be objectionable, then I heat the brine in a tubular steam-heater without contact with the steam and then pass it into the purifier, where the impurities will be deposited and abstracted; or preferably, and as fully shown and described hereinafter for the purpose of salt-making, I construct the heating-surface by which the brine can be heated without direct contact with the steam in the purifier, upon the surfaces of which the impurities will remain. I attain these objects by the mechanism illustrated in the accompanying drawings, in which—

Figure 1:
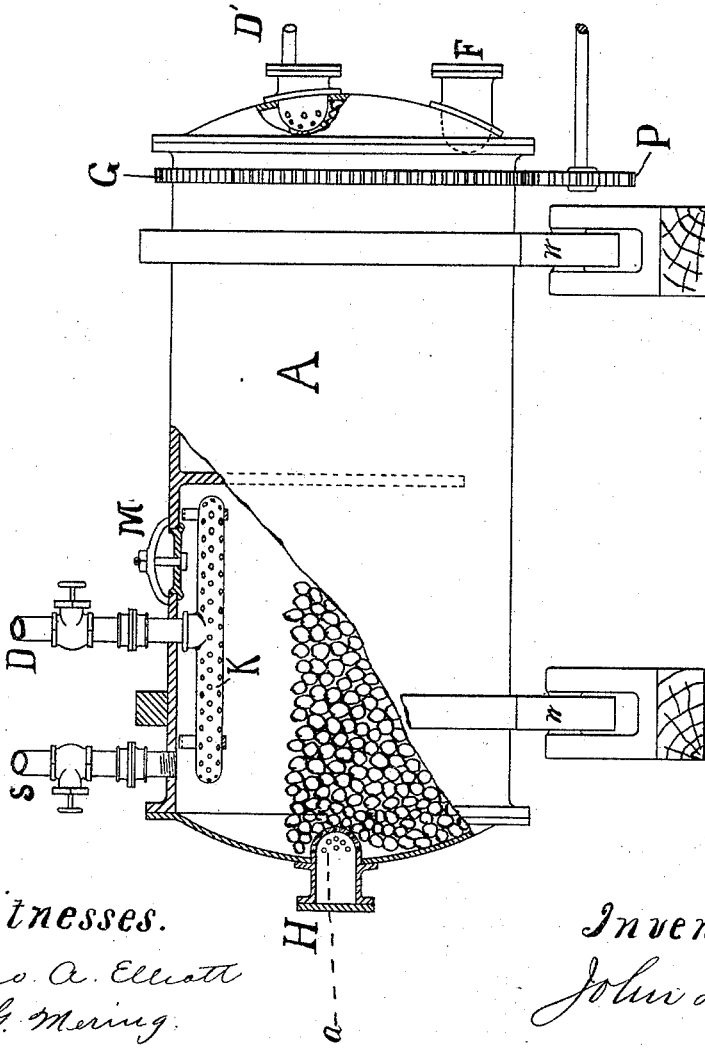
Figure 4:
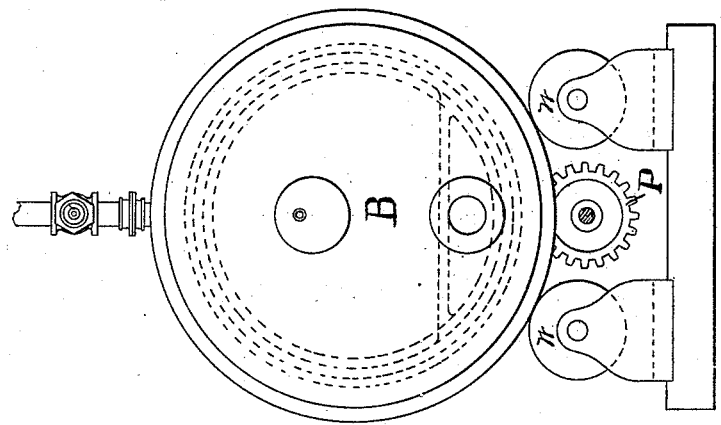
Figure 3:
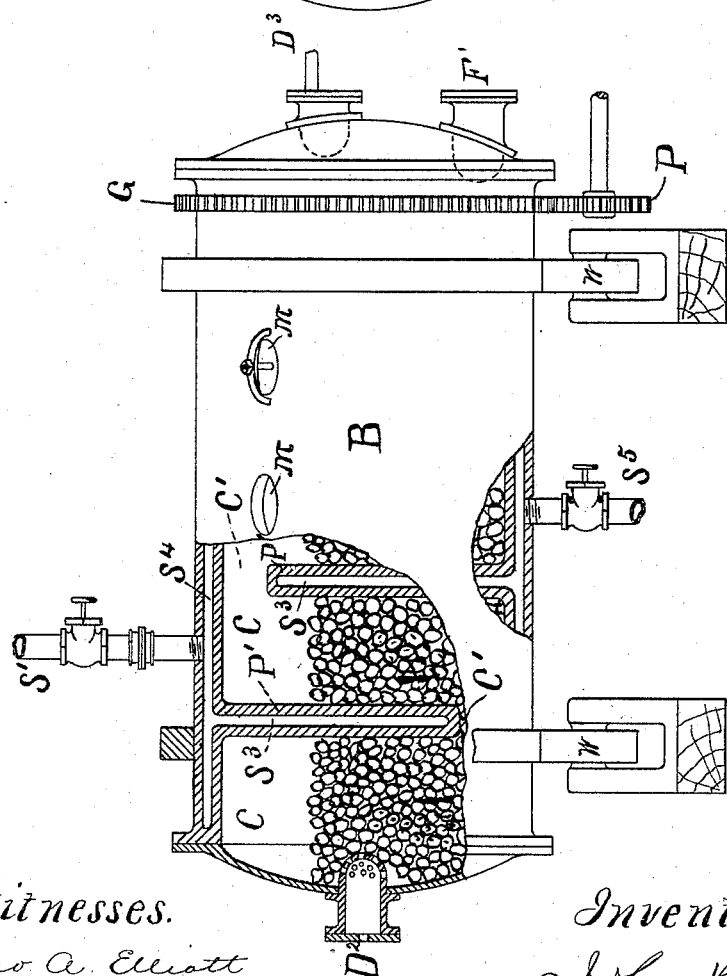

Figure 1 is an elevation of a purifier arranged to operate with a current of live steam in direct contact with the liquid under treatment. It is shown with a portion of the side cut away to illustrate the internal arrangement, and the remaining parts to show the outside arrangements and connections and a portion of the depositing substances in place. Fig. 2 is an end view of Fig. 1. Fig. 3 is an elevation of a purifier arranged to operate with steam applied in jacekts or spaces without contact with the liquid under treatment. It is shown with a portion of the side cut away to show the internal arrangement of the steam-passages, the connections for inlet and exit of steam and liquid, and a portion of the depositing material in place. Fig. 4 is an end view of Fig. 3.

Similar letters refer to similar parts.

These purifiers are shown in longitudinal, end, and cross section, with a part of one side removed and with a portion of the depositing substances shown in place. They are made of cast or wrought iron or parts of each strong enough to be capable of sustaining a greater pressure than the steam-boiler or other apparatus which is used in connection. They are of cylindrical shape, the ends or heads being rounded out and so fitted as to be easily removed, if necessary. Around the outside of each (shown in A and B) are two belts or trackways, which rest upon four wheels W W—two at each end of the vessel—and are supported by proper shafts and bearings. A gear G is fastened around the vessel, into which a pinion P is geared and upon the shaft of which power is applied from a motor to rotate the purifier.

D is the supply-inlet pipe; D', the exit-pipe for water or brine; S, the steam-supply pipe.

X X are projections inside the purifier to cause a portion of the contents to go with the direction of the motion. (Shown in the end view, Fig. 1.)

F is an opening to be used when washing the purifier.

A man-hole M is provided to fill or empty the purifier, which may also be done by removing one of the ends or heads.

When used for boiler-feed water, the purifier may be set entirely above the level of the water in the boiler, in which case, when live steam is admitted, all the surfaces contained will be heating-surfaces. It may also be set so that the level of the water-line in the boiler will be about two thirds ($\frac{2}{3}$) the height of the purifier, when most of the surfaces will be submerged, as shown in $a$, Fig. 1.

When using the vessel B for treating brine for salt-making, the purifier will be entirely filled with brine heated by the steam-surfaces in it.

I fill the purifiers about two-thirds ($\frac{2}{3}$) full of common hard gravel of about three-fourths ($\frac{3}{4}$) inch in diameter. It will be cheap and plenty in most places and will be found adapted to resist the abrading action in the purifier. Pieces of hard stone, broken to about the same size, will answer as well. In fact, any material that will stand the action and not soften with the heat will do as well.

The vessel B, Figs. 1 and 2, Sheet 2, has inlet for steam S'. $D^2$ is the water-supply pipe, $D^3$ the exit-pipe F' to be used when washing out the purifier.

The purifier is arranged upon wheels and supplied with gear to rotate it, the same as vessel A.

P' P' are partitions arranged vertically in the vessel, having a steam-space in them $S^3 S^3$, which connect with a steam-space in the shell of the vessel, (marked $S^4$,) extending around it except the ends.

C C are compartments made by the partitions, which are connected together by openings for the passage of the liquids. They extend along at even spaces the length of the vessel. The openings between the compartments are marked C' C'. Each of the compartments are two-thirds full of gravel, and upon each is placed a man-hole M for access into the interior of each compartment. A pipe $S^5$ is to carry off the water of condensation from the steam in the divisions and jackets.

In both the vessels the pipes F, F', and D, Figs. 1 and 2, have upon their ends inside a perforated strainer to allow liquids to pass and yet retain the gravel.

The operation is as follows: The purifier, as in A, Fig. 1, Sheet 1, is set when two-thirds full of gravel and water at the water-line of the boiler $a$. Steam is admitted at S, water pumped in at D, and sprayed through the sprayer K onto the gravel, which, as the steam is at boiler-pressure, will be of the same temperature. The water is immediately heated, and, flowing downward and through the gravel, carries the impurities against the surfaces of the gravel, where they adhere and form a coating. The purified water then passes into the boiler by gravity, an equilibrium having been formed by the admission of live steam at full pressure through S from the boiler, and by a pipe D' from the purifier to the water in the boiler A, so that all the water pumped into the purifier will pass into the boiler by gravity. A large surface is provided by the gravel for depositing impurities, as a purifier forty-two (42) inches in diameter and seven (7) feet long will present about two thousand (2,000) square feet. After a length of time proportional to the size of the purifier and contents and the quality of the water under treatment the water-pipes and the steam-pipes are disconnected, (or they may be arranged to permit the vessel to rotate without,) the cover is removed, and the vessel is rotated about three revolutions per minute and the deposits rubbed off from the gravel and from the interior of the purifier. This may be done dry and the impurities washed out. It is better, however, to insert a hose in the center in the opening H, Fig. 1, and keep the contents wet and a current of water flowing through, flowing out the ground-up impurities from the purifier. The time required for the rotation of the purifier is dependent on amount and quality of deposited impurities. In case at any time the impurities should be allowed to increase to too great an extent the man-holes may be removed, the contents broken apart, and the vessel revolved as before. It will be observed that this is not filtration, there being no intercepting medium. The liquids pass around and among the stones, coating all parts of them and the surfaces of the purifier that are exposed to the liquid. Such portions of the stones as are in contact or touch the purifier prevent formations, so that the impurities are not deposited in an even homogeneous coating, like the strata shown in steam-boiler incrustations, but are in a reticulated form, all of the points in contact being clean while the rest are coated. Now when the vessel is rotated and the rubbing, grinding, and abrading action ensues, the surfaces are more easily cleaned than if the whole surface were coated alike. After the openings are closed and connections restored the purifier is ready for another operation. The purifier B, Figs. 1 and 2, Sheet 2, is operated in like manner in respect to filling and cleaning. During the latter, however, the heating-surfaces for the sides and ends of the compartments C C are also cleaned, so that when B is used the heating and purifying and cleaning are done without contact with the steam, and the vessel may be full of liquid and gravel.

I have described a rotating vessel, as I consider it best for the purpose; but it is obvious that one of the important steps of my process is the cleansing by rubbing and abrasion, which is caused by the rotation of the purifier. This effect may be also attained by a semi-reciprocating rotary action of the vessel or contents.

The purifier need not be horizontally placed, but may be upright or at any angle of inclination.

In reference to the kind of impurities collected, rubbed, or abraded off and eliminated from the purifier they are those that form the usual scale and deposit in steam-generators or evaporators, sulphates and carbonates of lime and magnesia, also some earthy matter and silica held in suspension and which will be deposited with the other matters. The chlorides of lime and magnesia will remain in the fluid and must be emptied from the steam-boiler from time to time and separated from the brine in any well-known manner.

A modification of my process would be to place the purifier over a fire like a steam-boiler and obtain the same result.

Having thus described the nature of my invention, what I claim, and desire to secure by Letters Patent, is—

1. The process herein described of purifying fresh or salt water, which consists of first heating the liquid to make the impurities insoluble, then depositing the impurities on the surfaces of substances in the purifier, and then rotating or agitating the purifier so as to cause the depositing-surfaces to rub against and abrade each other and the interior of the purifier for the purpose of separating and eliminating the impurities, in the manner as described.

2. The process herein described of purifying fresh or salt water, which consists of heating the liquid to make the impurities insoluble in a purifier heated with steam not in contact with the liquid, then depositing the impurities on the substances in the purifier and on the internal heating-surfaces of it, and then rotating or agitating the purifier so as to cause the depositing-surfaces to rub against and abrade each other and the interior of the purifier for the purpose of simultaneously separating the impurities from the depositing materials and cleaning them and the heating-surfaces of the purifier in the manner described.

JOHN L. ALBERGER.

Witnesses:
A. H. ALBERGER,
HORACE WILLIAMS.